United States Patent
Gupta et al.

(10) Patent No.: US 10,810,775 B2
(45) Date of Patent: Oct. 20, 2020

(54) AUTOMATICALLY SELECTING AND SUPERIMPOSING IMAGES FOR AESTHETICALLY PLEASING PHOTO CREATIONS

(71) Applicant: Adobe Inc., San Jose, CA (US)

(72) Inventors: Sonali Gupta, New Delhi (IN); Sameer Bhatt, Uttar Pradesh (IN); Aanchal Somani, Uttarakhand (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/280,267

(22) Filed: Feb. 20, 2019

(65) Prior Publication Data
US 2020/0265623 A1    Aug. 20, 2020

(51) Int. Cl.
G06T 11/60    (2006.01)
G06K 9/00    (2006.01)

(52) U.S. Cl.
CPC .......... *G06T 11/60* (2013.01); *G06K 9/00248* (2013.01); *G06T 2200/21* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0098983 A1* | 5/2003 | Terada | ...................... | G06T 9/00 358/1.2 |
| 2004/0062439 A1* | 4/2004 | Cahill | ...................... | G06T 5/50 382/173 |
| 2006/0187321 A1* | 8/2006 | Sakamoto | ............ | H04N 1/3871 348/239 |
| 2008/0056530 A1* | 3/2008 | Wu | .................... | H04M 1/72544 382/100 |
| 2010/0262616 A1* | 10/2010 | Eskolin | .............. | G06Q 30/0256 707/769 |
| 2012/0069131 A1* | 3/2012 | Abelow | ............... | G06Q 10/067 348/14.01 |
| 2016/0196679 A1* | 7/2016 | Koyama | ................. | G06T 13/80 348/222.1 |
| 2016/0364846 A1* | 12/2016 | Paris | ....................... | G06T 11/60 |
| 2019/0295216 A1* | 9/2019 | Suitoh | ..................... | G06T 5/006 |

OTHER PUBLICATIONS

Adorama Camera, Inc., "Double Exposure: A Step-By-Step Guide to Creating Multiple Exposure Images", https://www.adorama.com/alc/double-exposure-a-step-by-step-guide-to-creating-multiple, Jan. 9, 2018, accessed Feb. 19, 2019, 15 pages.
Ramirez, Jesus, "Turn a Double Exposure Purple", https://create.adobe.com/2017/12/8/photoshop_how_to_tur.html, Dec. 8, 2017, accessed Feb. 19, 2019, 14 pages.

* cited by examiner

*Primary Examiner* — Jeffery A Brier
(74) *Attorney, Agent, or Firm* — Kilpatrick Townsend & Stockton LLP

(57) ABSTRACT

This application relates generally to computer-implemented methods and systems for computer graphics processing. Specifically, the application involves automatically selecting and blending images based on image aesthetic scores. Computer systems are provided that may blend an automatically selected foreground image with an automatically selected background image to produce an editable photo creation.

20 Claims, 10 Drawing Sheets

AUTOMATICALLY SELECTING AND SUPERIMPOSING IMAGES FOR AESTHETICALLY PLEASING PHOTO CREATIONS

TECHNICAL FIELD

This application relates generally to computer-implemented methods and systems for computer graphics processing. Specifically, the application involves automatically selecting and blending images based on image aesthetic scores.

BACKGROUND

Image blending is the technique of creating a final image out of one or more images. However, the process of image blending may be a very tedious and time intensive process. Image blending may require expertise in the processes of blending, filtering, positioning and/or masking source photos. Furthermore, an image editing tool may have access to several thousand images and it may be difficult to locate high quality source images within those several thousand images that are ideal for image blending. In addition, even if an image editing tool is successfully able to blend source images together, the result may not be aesthetically pleasing. As a result, there is a need for a system that may automatically select high quality images and blend those high quality images to produce an aesthetically pleasing photo creation.

One of the many challenges with generating a photo creation from two images is the time it may take to successfully blend two images within an image editing system. For example, when creating a double exposure photo creation, the processes of blending, filtering, positioning and/or masking source photos may have to be manually performed or may not be capable of being manually performed. These processes may take several minutes to several hours to complete if the processes can even be completed at all. The time spent to generate a double exposure photo and/or the generable ability to generate a double exposure photo may be due to the inefficiencies of current image editing systems.

Another challenge with creating a photo creation from two source images is selecting a suitable foreground image and a suitable background image. When creating a photo creation from source images, it may be important to blend two compatible source images. Otherwise, even if a proper process is followed for generating a photo creation, the end result may be a low-quality image that is not aesthetically appealing to the human eye (e.g., having a low image aesthetic score).

BRIEF SUMMARY

This application relates generally to computer-implemented methods and systems for computer graphics processing. Specifically, the application involves automatically selecting and blending images based on image aesthetic scores.

In one embodiment, a computer system may perform a method for automatically generating a photo creation based on a first and second image. The computer system may receive a first plurality of images associated with a user. The computer system may generate, for one or more images within the first plurality of images, a face quality score based on a number of faces in the first image and a face prominence ratio determined from a diameter of a face in the first image. The computer system may select, based on the face quality score, a first image from the first plurality of images. The computer system may identify, from a second plurality of images associated with the user, a second image. In one embodiment, the second image depicts zero human faces. The computer system may blend the first image with the second image to produce a photo creation.

In one embodiment, the computer system may identify based at least in part on an image aesthetic score of each image within the second plurality of images, the second image. In one embodiment, the second image is associated with one or more image tags, and each image tag of the one or more image tags indicates contents within an image.

In one embodiment, in order to blend the first image with the second image, the computer system may invert one or more pixels of the first image to generate a first set of inverted pixels. The computer system may further invert one or more pixels of the second image to generate a second set of inverted pixels. The computer system may further multiply the first set of inverted pixels with the second set of inverted pixels. In one embodiment, the computer system may further invert a product of the first set of inverted pixels and the second set of inverted pixels.

In one embodiment, the computer system may generate a first image layer based at least in part on the first image. The computer system may further generate a second image layer comprising a masked version of the first image. The computer system may further generate, based at least in part on the second image layer, a third image layer comprising photometric parameters associated with the second image layer. The computer system may further generate a fourth image layer based at least in part on the second image. The computer system may further create a photo creation with a double exposure effect by blending pixels of the second image layer and fourth image layer. The computer system may further output the photo creation with the double exposure effect with modifiable layers as an output file. The computer system may, subsequent to the photo creation being created, modify the first image layer, the second image layer, the third image layer, or the fourth image layer.

DETAILED DESCRIPTION

Figure 1:
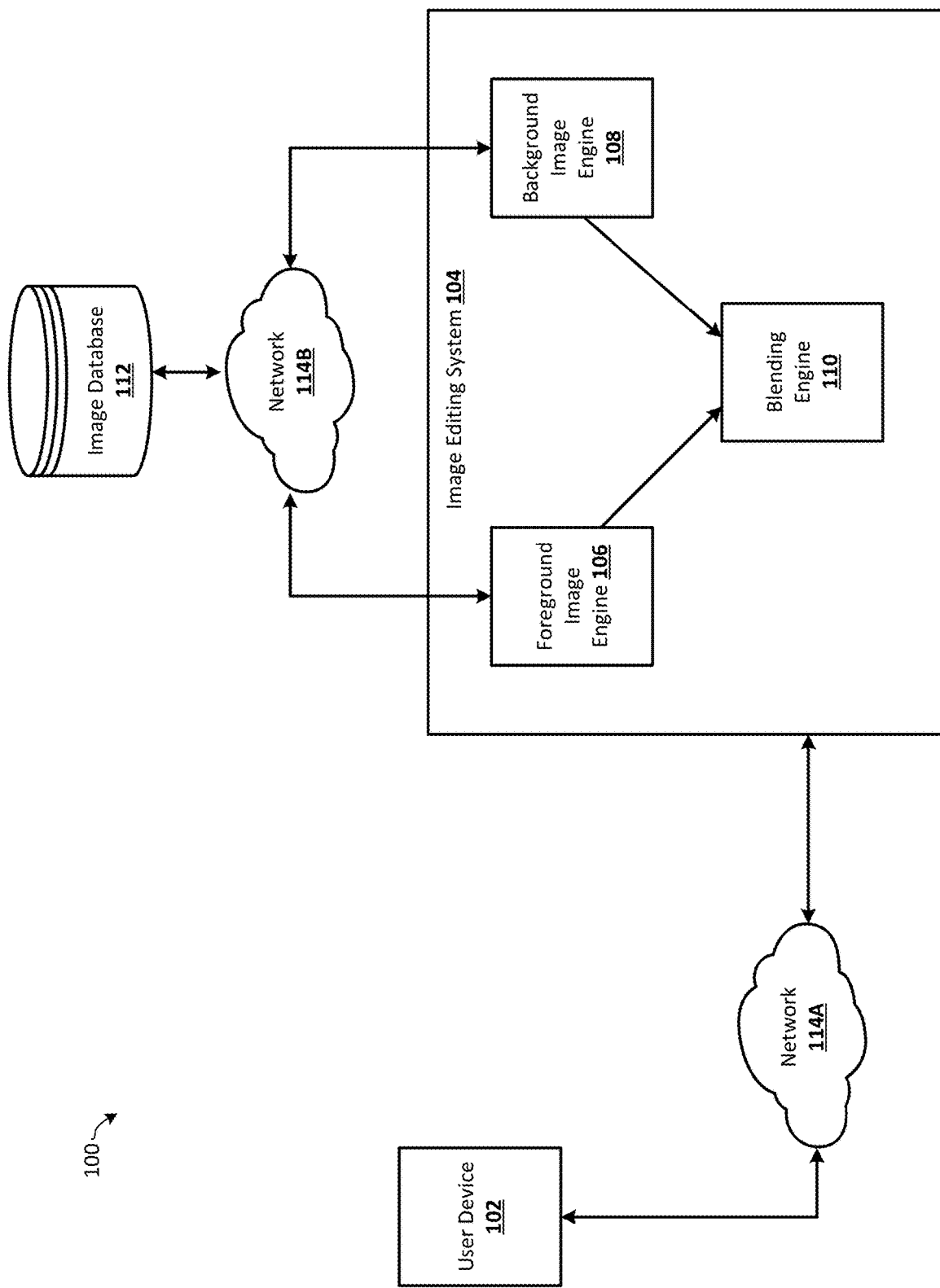
FIG. 1 depicts a simplified block diagram of a network that is in accordance with one or more embodiments.

Features, embodiments, and advantages of the present disclosure are better understood when the following Detailed Description is read with reference to the accompanying drawings.

Techniques described herein include systems and methods for automatically selecting and blending images based on image aesthetic scores. Embodiments described herein address the limitations of current image editing applications by implementing techniques to automatically select source images and blend those source images together to form a photo creation. In one embodiment, the source images may include a foreground image and a background image. The foreground image may be selected based on a first set of criteria (including an image aesthetic score) and the background image may be selected based on a second set of criteria. The foreground image and the background image may then be blended by methods and processes described herein to create an aesthetically pleasing photo creation.

According to aspects of the present disclosure, techniques for generating a photo creation from two or more images are disclosed. In one embodiment, a foreground image may be determined from a catalogue of images based on a first set of criteria. The first set of criteria may be based on various data points including an image aesthetic score associated with an image, a number of faces within the image, a face prominence ratio associated with the image, and/or an overall face quality score associated with the image. In one embodiment, a machine learning model may be utilized to select a face (i.e., a subject) within the foreground image and generate a selection mask, which may be combined with the original foreground image to produce an image layer comprising a subject from the foreground image on a white (or close to white) background to which an effect (e.g., double exposure effect) may be applied. In one embodiment, a background image may be determined from the catalogue of images based on a second set of criteria. The second set of criteria may be based on various data points, including a number of faces within an image, a tag associated with the image, and/or an image aesthetic score associated with the image.

In one embodiment, a plurality of image layers may be generated based on the determined foreground image and background image. A first image layer may comprise the determined foreground image. A second image layer may be generated from the first image layer and may comprise the subject within the foreground image with a white (or close to white) background. A third image layer may be an adjustment layer that controls one or more photometric parameters (e.g., brightness and contrast) of the second image layer. A fourth image layer may be generated by identifying a region of interest within the determined background image. The second image layer and the fourth image layer may be blended together and modified based on the third image layer to generate a photo creation. The resulting photo creation may be a photo creation comprising of a superimposed foreground image and background image with various photometric parameters modified by an adjustment layer.

The photo creation may be output in a layered media file. The layered media file may contain one or more of the image layers that comprise the photo creation. For example, the layered media file may contain an editable version of the first, second, third, and fourth image layers, thus, allowing modification to one or more aspects of an automatically generated photo creation subsequent to the photo creation being generated. For example, a region of interest in the background image may be altered by modifying the fourth image layer of the layered media file. In another example, the first and second image layers may be modified by selecting a different foreground image. By outputting the photo creation as a layered media file (e.g. Photoshop document) one or more automatically generated image layers may be later modified.

The techniques disclosed herein may be an improvement to image editing technology and computer systems themselves. To blend one or more images within an image editing tool, one or more complex operations may have to be performed. These one or more complex operations may not be offered by the image editing tool or may be selectable within the image editing tool. Thus, presenting a simple option, that when invoked, automatically blends one or more images into an aesthetically pleasing photo creation may increase the usably of image editing technology.

The techniques disclosed herein may be an improvement to a computer system itself by efficiently utilizing computational resources. If one or more complex tasks are manually performed, it may require additional computational resources to be utilized for a longer period of time. For example, once a chain of one or more complex processes commences to generate a photo creation, one or more states of the photo creation may be stored in temporary memory, such that an undo command may be utilized for one or more complex operations. In such an example, the temporary memory consumed by an image editing tool may severely hinder the operation of the image editing tool itself or other applications (e.g., background applications) operating on the same computer system. By automatically generating a photo creation based on the techniques disclosed herein, temporary memory associated with an image editing tool may be quickly utilized and released due to the efficiency and automation of the photo creation process, which may reduce a bottleneck of temporary memory usage associated with manually performing one or more complex image editing processes. In such an instance, instead of temporary memory having to store image(s) or states of images(s) associated with one or more complex processes (in case of an undo operation), the temporary memory may only need to store an image(s) or states of image(s) prior to invoking a photo creation operation, which may result in less temporary memory being utilized.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 illustrates exemplary system 100 for implementing one or more embodiments described. In one embodiment, system 100 may be a cloud-based system. System 100 may include user device 102, image editing system 104, image database 112, and networks 114A and 114B. User device 102 may be a device operated by a user associated with system 100. User device 102 may execute one or more applications that allow the user device to request, via network 114, one or more operations associated with image editing system 104. For example, user device 102 may request image editing system 104 to blend two or more images associated with user device 102 that are stored within image database 112. In one embodiment, a user associated with user device 102 may authenticate to image editing system 104 via user device 102 by various means such as biometric authentication, two factor authentication, password authentication, and the like. User device 102 may include various types of computing systems, such as portable handheld devices, general-purpose computers (e.g., personal computers and laptops), workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices.

Image editing system 104 may be a cloud-based system that performs various image editing processes. In one embodiment, image editing system 104 may be a server (or other computing device) that is remote from user device 102. Image editing system 104 may include foreground image engine 106, background image engine 108, and blending engine 110. Foreground image engine 106 may determine a catalogue of images associated with an account (e.g., a user account associated with user device 102). The catalogue of images may be a plurality of images stored within one or more locations (e.g., image database 112) associated with a device or account. For example, the catalogue of images may be stored within an associated user device (e.g., user device 102) or within a database (e.g., image database 112). Foreground image engine 106 may determine one or more foreground images from the catalogue of images based on a first set of criteria. The selected one or more foreground images may be sent to blending engine 110 for further processing.

Background image engine 108 may determine a catalogue of images associated with an account (e.g., a user account associated with user device 102). The catalogue of images may be a plurality of images stored within one or more locations (e.g., image database 112) associated with a device or account. For example, the catalogue of images may be stored within an associated user device (e.g., user device 102) or within a database (e.g., image database 112). Background image engine 108 may determine one or more background images from the catalogue of images based on a second set of criteria. The selected one or more background images may be sent to blending engine 110 for further processing.

Blending engine 110 may blend a foreground image received from foreground image engine 106 with a background image received from background image engine 108. In one embodiment, blend engine 110 may implement different blending processes based upon a desired photo/image effect. For example, a first process may be implemented for blending images to create a double exposure effect and a second process may be implemented for blending images to create a mosaic effect.

Foreground image engine 106, background image engine 108, and blending engine 110 may each be implemented by one or more processors and non-volatile memory resources. The processor(s) may include single or multicore processors. The processor(s) may include general purpose microprocessors such as ones provided by Intel®, AMD®, ARM®, Freescale Semiconductor, Inc., and the like, that operate under the control of software stored in associated memory. An application executed by image editing system 104 may be executed by the processor(s). In one embodiment, the application executed by image editing system 104 may cause image editing system 104 and its various components to process one or more images in accordance with embodiments described herein.

Image database 112 may store one or more catalogues of images associated with image editing system 104. Image database 112 may comprise different catalogues of images associated with different user accounts and/or different user devices. A catalogue of images may comprise a plurality of images that share at least one commonality. The commonality may be ownership by one or more users. For example, all of the images within a catalogue of images may be images captured by or downloaded by a specific user. In one embodiment, a commonality may be an entity affiliated with an image. For example, all of the images within a catalogue of images may be images provided by an image editing company such as ADOBE SYSTEMS. In such an example, a catalogue of images may be stock images provided by an image editing company or an image editing system. A catalogue of images may comprise a significant amount of images such as hundreds, thousands, tens of thousands, or millions of images. The images within a catalogue of images may be various formats including, but not limited to, Joint Photographic Experts Group (JPEG), Exchangeable Image File Format (EXIF), Graphics Interchange Format (GIF), Windows Bitmap (BMP), Portable Network Graphics (PNG), and the like.

Networks 114A and 114B may facilitate communications between the various systems depicted in FIG. 1. Networks 114A and 114B can be of various types and can include (for example) the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, Bluetooth®, and other protocols. In general, networks 114A and 114B may include any infrastructure that facilitates communications between the various systems depicted in FIG. 1. In one embodiment, networks 114A and 114B may be implemented in a single communication network. In one embodiment, network 114B may be a restricted network such that image editing system 104 and image database 112 may securely communicate (e.g., an encrypted channel, authorized channel, private channel, private virtual network, and the like). In such an example, network 114B may be a public communication network.

Figure 2:
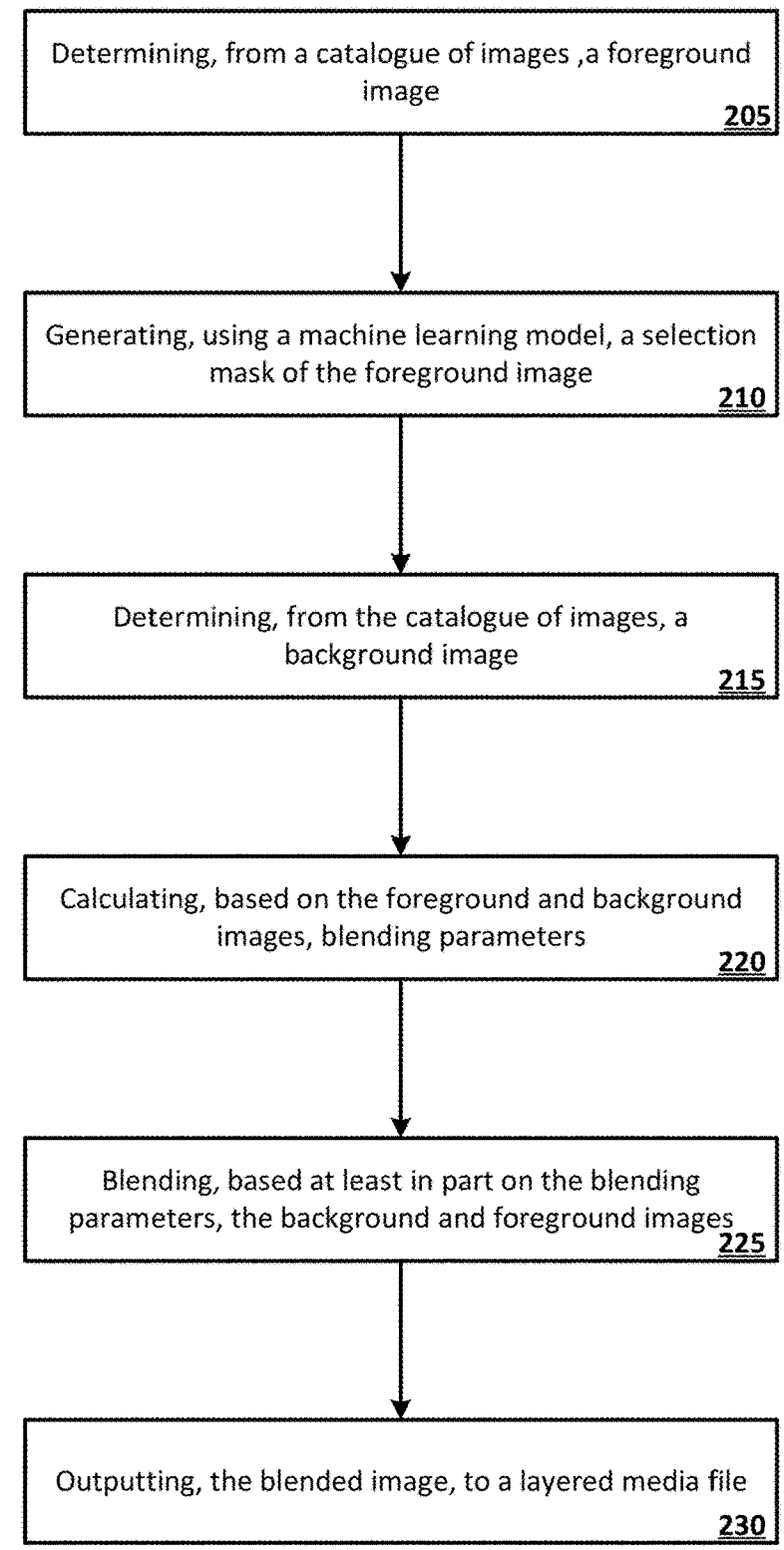
FIG. 2 illustrates an example process in accordance with one or more embodiments.

FIG. 2 illustrates exemplary process 200 for implementing one or more embodiments described. Process 200 may be performed by one or more components of an image editing system. The image editing system may be a stand-alone computing device such as a mobile phone, a smart phone, a computer, and the like. In one embodiment, the image editing system may be a cloud-based computing device such as a server or database that may perform one or more operations for a remotely connected thin computing device, such as a mobile phone. Process 200 may be a general overview of one or more processes performed by an image editing system. At 205, the image editing system determines, from a catalogue of images, a foreground image. The catalogue of images may be a set of images associated with a user account. The user account may be associated with a user device that may interact with the image editing system. For example, the user account may be associated with a user device that requests image editing system 104 to generate a blended image.

In one embodiment, a foreground image may be determined from a catalogue of images based on a first set of criteria. The first set of criteria may be based on various data points including an image aesthetic score associated with an image, a number of faces within the image, a face prominence ratio associated with the image, and/or an overall face quality score associated with the image. In one embodiment, there may be threshold values associated with each of these data points. In circumstances when an image of the catalogue of images does not meet one or more threshold values associated with one or more data points, that particular image may be filtered (e.g., removed) from the catalogue of images as a potential foreground image. In one embodiment, a single foreground image may be determined, which may be a high quality image based on the first set of criteria.

At 210, the image editing system determines, using a machine learning model, a selection mask of the foreground image. Due to the characteristics of the selected foreground image, an object (i.e., a subject) within the foreground image may be easily identified and selected. For example, the selected foreground image may comprise a high quality image of a person's face (e.g., a subject). In such an example, a person's face may be an easily identifiable and selectable subject. In one embodiment, a subject may automatically be identified and selected based on a machine learning model. The machine learning model may be a neural network that may receive, as an input, an image and identify from the image one or more subjects within the image. The machine learning model may learn a structure of alpha mattes or "color" channels that contain all transparencies in an image. Common alpha mattes may include hair and fur as well as semi-transparent objects or even optical blur created from a slow shutter speed. By utilizing the structure within an image, via alpha mattes, the machine learning model may separate a subject within an image from a background within an image.

Using a machine learning model rather than having a user manually select a subject within a foreground image may produce more accurate results as well as save processing time. It may be very difficult or near impossible for a user to manually differentiate a pixel that is part of a subject versus a pixel that is part of a background, especially when said pixels are at the edge (boundary) connecting the background and the subject. However, the machine learning model may be able to determine the distinction between a subject and a background at the pixel level, which may create a more accurate subject selection. Once a subject in the foreground image is selected a selection mask may be combined with the foreground image to generate an image that comprises the identified subject within the foreground image on a white (or opaque) background.

At 215, the image editing system determines, from the catalogue of images, a background image. In one embodiment, a background image may be determined from the same catalogue of images that the foreground image was selected from. In such an embodiment, the background image may be selected from the catalogue of images based on a second set of criteria. The second set of criteria may be based on various data points including a number of faces within an image, a tag associated with the image, and/or an image aesthetic score associated with the image. In one embodiment, there may be threshold values associated with each of these data points. In circumstances when an image of the catalogue of images does not meet one or more threshold values associated with one or more data points, that particular image may be filtered (e.g., removed) from the catalogue of images as a potential background image. In one embodiment, a single background image may be determined, which may be a high quality image based on the second set of criteria.

At 220, the image editing system calculates, based on the foreground image and background images, blending parameters. The blending parameters may comprise photometric parameters of the foreground image and/or a region of interest within the background image. In one embodiment, photometric parameters may include a brightness value associated with one or more pixels within the foreground image, a luminance value associated with one or more pixels within the foreground image, or a saturation value associated with one or more pixels within the foreground image. In one embodiment, photometric parameters may be estimated based on one or more known machine learning models. The photometric parameters may be utilized to modify one or more aspects of the foreground image and/or the final photo creation.

At 225, the image editing system blends, based at least in part on the blending parameters, the background image and the foreground image. In one embodiment, the background image and the foreground image may be superimposed together by generating and blending a plurality of image layers. A first image layer may comprise the determined foreground image from 205. A second image layer may be generated from the first image layer and may comprise a subject within the foreground image on a white background as indicated at 210. A third image layer may be an adjustment layer that controls one or more photometric parameters (e.g., brightness and contrast) of the second image layer and/or the final photo creation. The third image layer may be generated based on the photometric parameters determined at 220. A fourth image layer may be generated by identifying a region of interest within the determined background image at 220. The second image layer and the fourth image layer may be blended together and modified based on the third image layer to generate a photo creation. The resulting photo creation may be a photo creation comprising of a blended foreground image and background image with various photometric parameters modified by an adjustment layer.

At 230, the image editing system, outputs the blended image (i.e., photo creation) to a layered media file. The layered media file may contain one of more of the image layers that comprise the photo creation. For example, the layered media file may contain an editable version of the first, second, third, and fourth image layers. Thus, allowing post production modification of one or more aspects of an automatically generated photo creation. For example, a region of interest of the background image may be altered after production of the photo creation by modifying the fourth image layer of the layered media file. In another example, the first and second image layers may be changed by selecting a different foreground image. By outputting the photo creation as a layered media file (e.g. Photoshop document) one or more automatically generated image layers may be later modified.

The region of interest may be rectangular coordinates within the background image that indicates an ideal portion of the background image to utilize for image blending. The region of interest may be determined based on a deep reinforcement learning model. Deep reinforcement learning models may refer to goal-oriented algorithms and methods, which learn how to attain a complex objective (e.g., a region of interest). A deep reinforcement learning model may start with a blank slate and, under the right conditions, is penalized when the model makes a wrong decision and rewarded when the model makes a right decision, thus reinforcing learning. A deep reinforcement learning model may be trained based on previous data sets that indicate aesthetically pleasing blended images. From those prior blended images, regions of interest may be identified from background images. In one embodiment, the region of interest may be determined based on object detection within the background image. For example, a background image may contain a plurality of mountains. In such an example, each mountain may be identified and a region of interest may be based on pixel values associated with each mountain. For example, the brightest identified mountain within a background image may be the region of interest. In another example, a mountain within a particular brightness range may be the region of interest. Thus, a region of interest within a background image may be determined based on photometric parameters of the background image.

At 310, the foreground image engine selects, from the plurality of images, image x. X may be a variable that may change throughout process 300. For simplicity of explanation, x may be initiated to the value of 1. As a result, the foreground image engine selects a first image from the plurality of images. The first image may be determined based on a date associated with each image within the plurality of images, such that the oldest or youngest image is the first image. In one embodiment, variable x may be incremented in process 300 such that each image in the plurality of images is selected at a different point in time.

Figure 3:
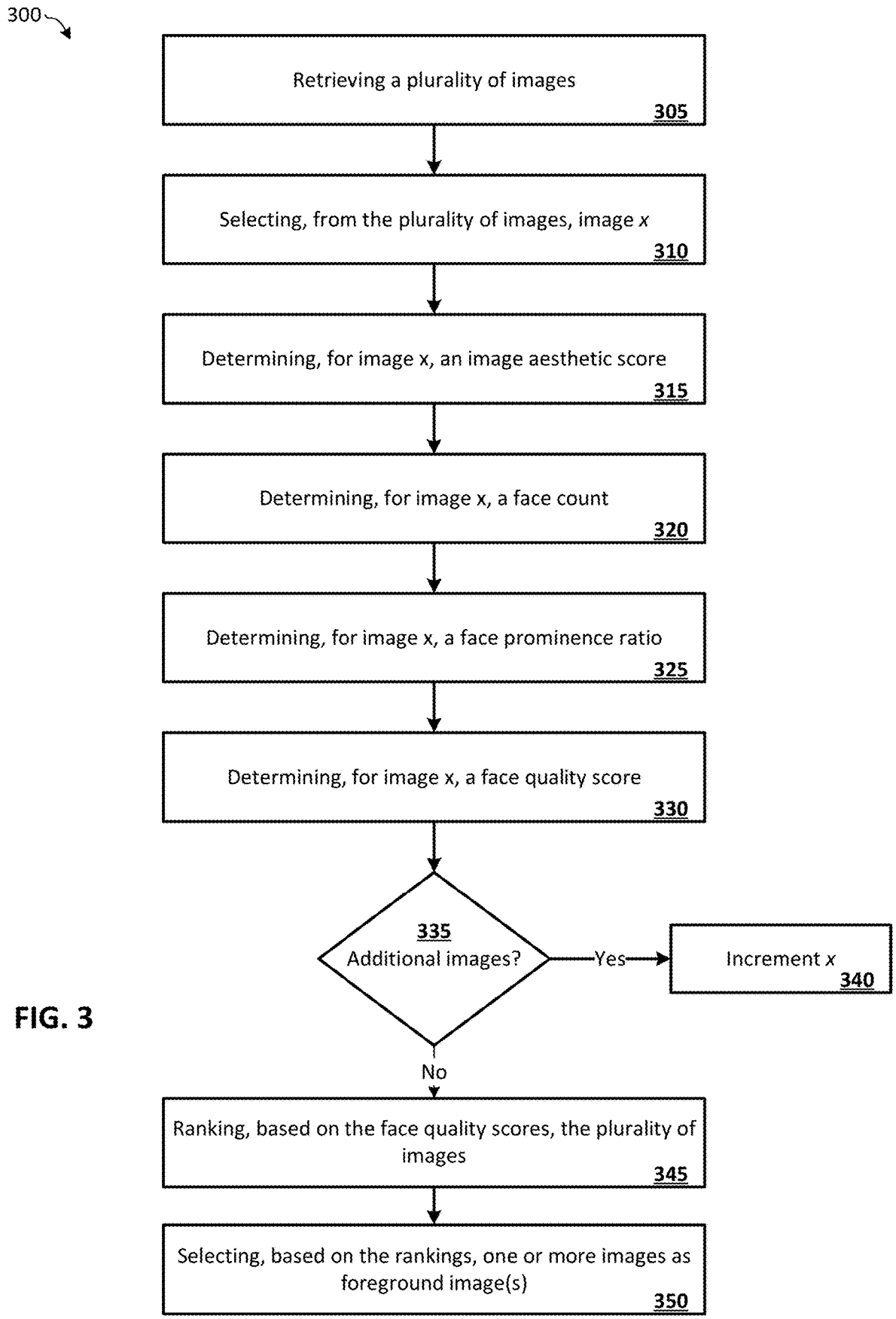
FIG. 3 illustrates an example process in accordance with one or more embodiments.

Aspects of process 200 provide an overview of one or more processes performed according to one or more embodiments. FIGS. 3-8 may expand or supplement upon one or more processes described by process 200. FIG. 3 illustrates exemplary process 300 for intelligently selecting one or more foreground images. Process 300 may be performed by a foreground image engine of an image editing system. At 305, the foreground image engine retrieves a plurality of images. The plurality of images may be images stored within one or more locations associated with the foreground image engine. For example, the plurality of images may be stored within a database associated with the foreground image engine. The plurality of images may comprise images that share at least one commonality. The commonality may be ownership by one or more users. For example, all of the plurality of images may be images captured or downloaded by a specific user. In one embodiment, a commonality may be an entity affiliated with an image. For example, all of the images within the plurality of images may be images provided by an image editing company such as ADOBE SYSTEMS. The plurality of images may comprise the same or different image formats.

At 320, the foreground image engine determines, for the first image, a face count. The face count may indicate how many faces are present in the first image. The foreground image engine may implement facial recognition software to determine a number of faces present in the first image. In one embodiment, the first image is removed from consideration of being selected as a foreground image if the face count is above a certain threshold (e.g. 1).

At 325, the foreground image engine determines, for the first image, a face prominence ratio. The face prominence ratio indicates how visible and prominent a person's face is in the first image. In one embodiment, the face prominence ratio is calculated by taking the ratio of the distance between the eyes of a face within the first image and the minimum image width and height of the first image. Alternatively, the face prominence ratio may indicate what percentage of the first image contains a person's face. For example, a face prominence ratio may indicate that 55% of pixels within an image are pixels displaying a person's face. In one embodiment, the first image is removed from consideration of being selected as a foreground image if the face prominence ratio is below a threshold (e.g., 0.25).

At 330, the foreground image engine determines, for the first image, a face quality score. The face quality score may be determined by the following formula: Face quality score= (FP_weight*FP)+(FC_weight*FC_score), where FP_weight=0.5, FP=1 if 0.09<FP_ratio<0.8, FP=0 in all other cases, FC_weight=0.5. FP_weight may be a weight associated with a face prominence score. FP may be a face prominence score based on the face prominence ratio determined at 325. FC_weight may be a weight associated with face compliance score. FC_score may be a face compliance score. In one embodiment, the first image is removed from consideration of being selected as a foreground image if the face quality score is below a threshold (e.g., 0.25).

A face compliance score may be determined using face recognition techniques. The face compliance score may comprise a Boolean value and weight associated with one or more characteristics of an image. The characteristics may include: image exposure, gray scale profile, eyes open best practice, face visibility, face area, and resolution. Image exposure may indicate if there is over or under exposure within the image. Gray scale profile may indicate if a face area has an intensity resolution of at least 7 bits (128 intensity values). Eyes open best practice may indicate if both eyes within a person's face are open. Eyes within an image may be checked independently and a logical AND may be applied to both single eye checks. Face visibility may indicate if only one face is visible otherwise the value for face visibility may be zero. Face area may indicate if the face area (from the chin to crown and from the left ear to right ear) fits the focus and depth in the field characteristics of the image. Resolution indicates that resolution is at least 180 pixels for the width of a subject's head or 90 pixels from a first eye center to a second eye center. Each of the characteristics may be represented by a Boolean value of 1 if the respective parameters are met or represented by a Boolean value of 0 if the respective parameters are not met. For example, if at least one of the subject's eyes are closed then the eyes open best practice will be presented with a Boolean value of 0. The following table (Table 1) represents weights associated with each characteristic.

TABLE 1

Image Characteristic Weights

| Image Characteristic | Weight |
| --- | --- |
| Image Exposure | 64 |
| Gray Scale Profile | 32 |
| Eyes Open Best Practice | 16 |
| Face Visibility | 8 |
| Face Area | 4 |
| Resolution | 2 |

The face compliance score may be the sum of each characteristic and corresponding weight value. For example, face compliance score may=(Image Exposure Weight*Boolean Image Exposure Value)+(Gray Scale Profile Weight*Boolean Gray Scale Profile Value)+(Eyes Open Best Practice Weight*Boolean Eyes Open Best Practice Value)+(Face Visibility Weight*Boolean Face Visibility Value)+(Face Area Weight*Boolean Face Area Value)+(Resolution Weight*Boolean Resolution Value). The face compliance score may be normalized to be a value between 0 and 1.

At 335, the foreground image engine determines if there are any additional images within the plurality of images. If there are additional images within the plurality of images then at 340, variable x is incremented and processes associated with 315-330 are performed for a second image within the plurality of images. In one embodiment, each image within the plurality of images may have an aesthetic score, face count, face prominence ratio, and a face quality score determined. If at 335, there are no additional images within the plurality of images then process 300 moves to 345.

At 345, the foreground image engine ranks, based on the face qualities scores, the plurality of images. In one embodiment, only the images that meet the aesthetic score threshold, the face count threshold, face prominence ratio, and the face quality score threshold are ranked. The plurality of images may be ranked in ascending or descending order according to each image's corresponding face quality score.

At 315, the foreground image engine determines, for the first image, an image aesthetic score. An image aesthetic score may be determined for the first image based at least on one or more of the following parameters: interesting content within the image, object emphasis, lighting, color harmony, quantity of vivid colors, depth of an image field, motion blur, rule of thirds, balancing element, repetition, peak signal-to-noise ratio, and/or structural symmetry. In one embodiment, a machine learning model may be utilized to determine an image aesthetic score of an image. Such a machine learning model may receive, as input, several images, each with an associated aesthetic score indicated by a human user. The machine learning model may be able to determine correlations between certain characteristics in images and certain scores. For example, an image that is blurry may regularly receive lower aesthetic score values. Such patterns may be identified by the machine learning model and applied to the first image to determine an image aesthetic score of the first image. In one embodiment, a neural network such as Neural Image Assessment may be utilized to determine an image aesthetic score. In one embodiment, the image aesthetic score may be scaled to be a value between 0 and 1, with 1 being the most aesthetically pleasing image. In one embodiment, the first image is removed from consideration of being selected as a foreground image if the image aesthetic score is below a threshold (e.g. 0.25).

Figure 4:
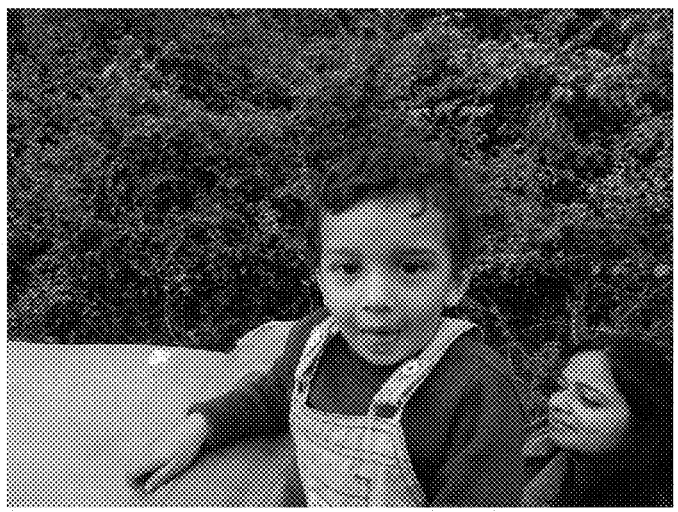
FIG. 4 depicts an example image within a catalogue of images in accordance with one or more embodiments.
Figure 5:
FIG. 5 depicts an example image within a catalogue of images in accordance with one or more embodiments.
Figure 6:
FIG. 6 depicts an example image within a catalogue of images in accordance with one or more embodiments.

FIGS. 4-6 may be images within a plurality of images as described with relation to FIG. 3 and process 300. FIG. 4 illustrates image 405. Image 405 may be an example of an image within a plurality of images that fails to meet face count threshold. In image 405, two faces are visible. In one embodiment, to create a high quality photo creation, a foreground image may be required to have a face count of 1. As a result, image 405 would not be considered as a potential foreground image.

FIG. 5 illustrates image 505. Image 505 may be an example of an image within a plurality of images that fails to meet a face prominence threshold. In image 505, the subject's face is visible, but does not occupy enough of the image to produce a high quality photo creation. For example, a face prominence ratio may be required to be 0.25, which may indicate a subject's face must occupy 25% or more of an image. As a result, image 505 would not be considered as a potential foreground image.

FIG. 6 illustrates image 605. Image 605 may be an example of an image within a plurality of images that meets the aesthetic score threshold, face count threshold, face prominence ratio threshold, and face quality score threshold. In comparison to image 405 and 505, it can be seen that image 605 contains a more pronounced face of a subject. Such an image may be utilized to produce a high quality photo creation. It should be noted that images 405, 505, and 605 are exemplary images that may be within a plurality of images (e.g. a catalogue of images) and are not meant to limit the types of images that may meet one or more thresholds described in process 300.

Figure 7:
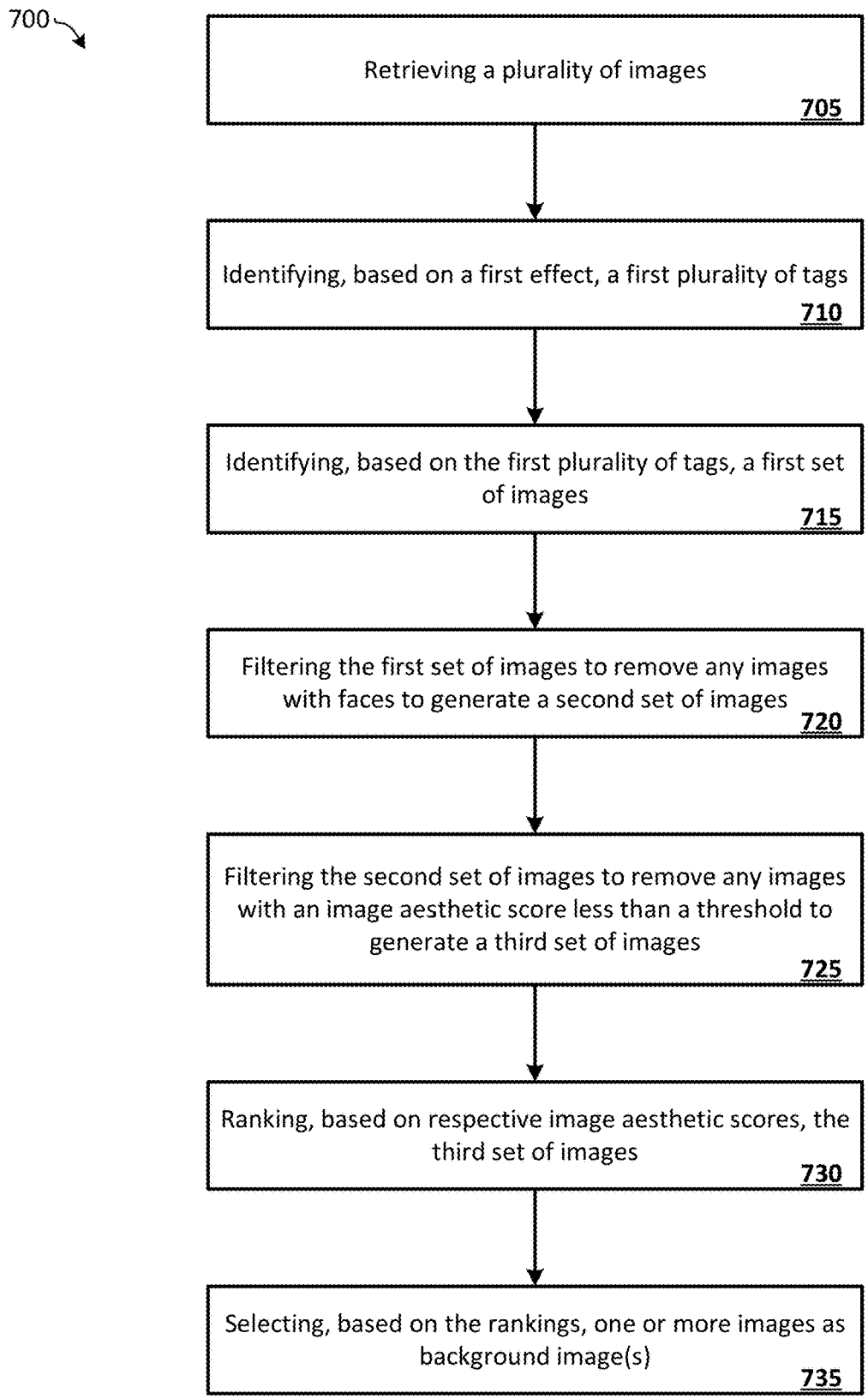
FIG. 7 illustrates an example process in accordance with one or more embodiments.

FIG. 7 illustrates exemplary process 700 for intelligently selecting one or more background images. Process 700 may be performed by a background image engine of an image editing system. At 705, the background image engine retrieves a plurality of images. The plurality of images may be images stored within one or more locations associated with the background image engine. For example, the plurality of images may be stored within a database associated with the background image engine. The plurality of images may comprise images that share at least one commonality. The commonality may be ownership by one or more users. For example, all of the plurality of images may be images captured by or downloaded by a specific user. In one embodiment, a commonality may be an entity affiliated with an image. For example, all of the images within the plurality of images may be images provided by an image editing company such as ADOBE SYSTEMS. The plurality of images may comprise the same or different image formats.

At 710, the background image engine identifies, based on a first effect, a first plurality of tags. In one embodiment, each image within the plurality of images may have an associated image tag. An image tag may identify an image type. For example, an image tag may be a mountain, a cloud, nature, city, building, architecture, tree, forest, lake, river, sea, ocean, bridge, snow, road, sky, waterfall, flower, outdoor, and/or indoor. A first plurality of tags may be identified based on a desired effect. For example, if the desired effect is a double exposure effect then a first plurality of tags may be selected such as an outdoor tag, tree tag, forest tag, lake tag and the like. In such an example, images associated with a particular set of tags may provide high quality photo creations for double exposure effect. On the other hand, a separate plurality of tags may be desirable for a different effect. For example, for a mosaic effect, a second plurality of tags may be identified such as an indoor tag, building tag, bridge tag, and the like. As a result, depending on the desired effect a different plurality of tags may be identified. In one embodiment, which tags correspond to which effects may be stored in memory associated with the background image engine such that when an effect is indicated the background image engine my retrieve which tags are associated with the effect.

At 715, the background image engine identifies, based on the first plurality of tags, a first set of images. The first set of images may be filtered to remove all images that do not have an associated tag within the first plurality of tags. For example, the first plurality of tags may include an outdoor tag, tree tag, forest tag, and lake tag. In such an example, only images within the plurality of images that are associated with an outdoor tag, tree tag, forest tag, and lake tag are included in the first set of images.

At 720, the background image engine filters the first set of images to remove any images with faces to generate a second set of images. In one embodiment, it may be desirable to have a background image that does not contain any human faces. An image without faces may be better suited to be blended with a foreground image that contains a human face. Facial recognition techniques may be performed by the background image engine to determine if one or more images within the first set of images contain human faces. As a result of the filtering process, a second set of images is generated.

At 725, the background image engine filters the second set of images to remove any images with an image aesthetic score less than a threshold to generate a third set of images. An image aesthetic score may be generated based on one or more techniques described previously. In one embodiment, the image aesthetic score may be normalized to be between the value of 0 and 1. In such am embodiment, a threshold may be set to, for example, 0.75. As a result, any image that has below a 0.75 image aesthetic score is filtered from the second set of images. The threshold may be set based on preference. As a result of the filtering process, a third set of images is generated.

At 730, the background image engine ranks, based on respective image aesthetic scores, the third set of images. The third set of images may be ranked in ascending or descending order according to each image's corresponding image aesthetic score.

At 735, the background image engine, selects, based on the rankings, one or more images as background image(s). In one embodiment, the image with the highest image aesthetic score may automatically be selected. In one embodiment, the top 3, 5, or 10 images may be selected as potential background image(s) and a user may manually select from the potential background image(s). In one embodiment, the top 3, 5, or 10 images may be selected as background image(s). In such an embodiment, a photo creation may comprise a plurality of background image(s). For example, a photo creation may be multiple foreground images and background images blended together to create a mosaic effect, double color exposure effect, and/or other effects that may require multiple background images.

Figure 8:
FIG. 8 depicts an example set of potential background images in accordance with one or more embodiments.

FIG. 8 illustrates an exemplary second set of images 800 according to one or more embodiments associated with process 700. Second set of images 800 may be a second set of images that are produced at 720 in process 700 as illustrated in FIG. 7. Second set of images 800 may contain first plurality of tags 802. First plurality of tags 802 may contain a plurality of tags associated with one or more images within second set of images 800. For example, each image in the section set of images 800 may be affiliated with one or more first plurality of tags 802. Each image in second set of images 800 may be subsequently filtered and/or ranked based on an image aesthetic score associated with each image within second set of images 800. From the ranked list a background image may be selected.

At 350, the foreground image engine, selects, based on the rankings, one or more images as foreground image(s). In one embodiment, the image with the highest face quality score may automatically be selected. In one embodiment, the top 3, 5, or 10 images may be selected as potential foreground image(s) and a user may manually select from the potential foreground image(s). In one embodiment, the top 3, 5, or 10 images may be selected as foreground image(s). In such an embodiment, a photo creation may be generated comprising a plurality of foreground image(s). For example, a photo creation may be multiple foreground images and background images blended to create a mosaic effect, double color exposure effect, and other effects that may require multiple foreground images.

Figure 9:
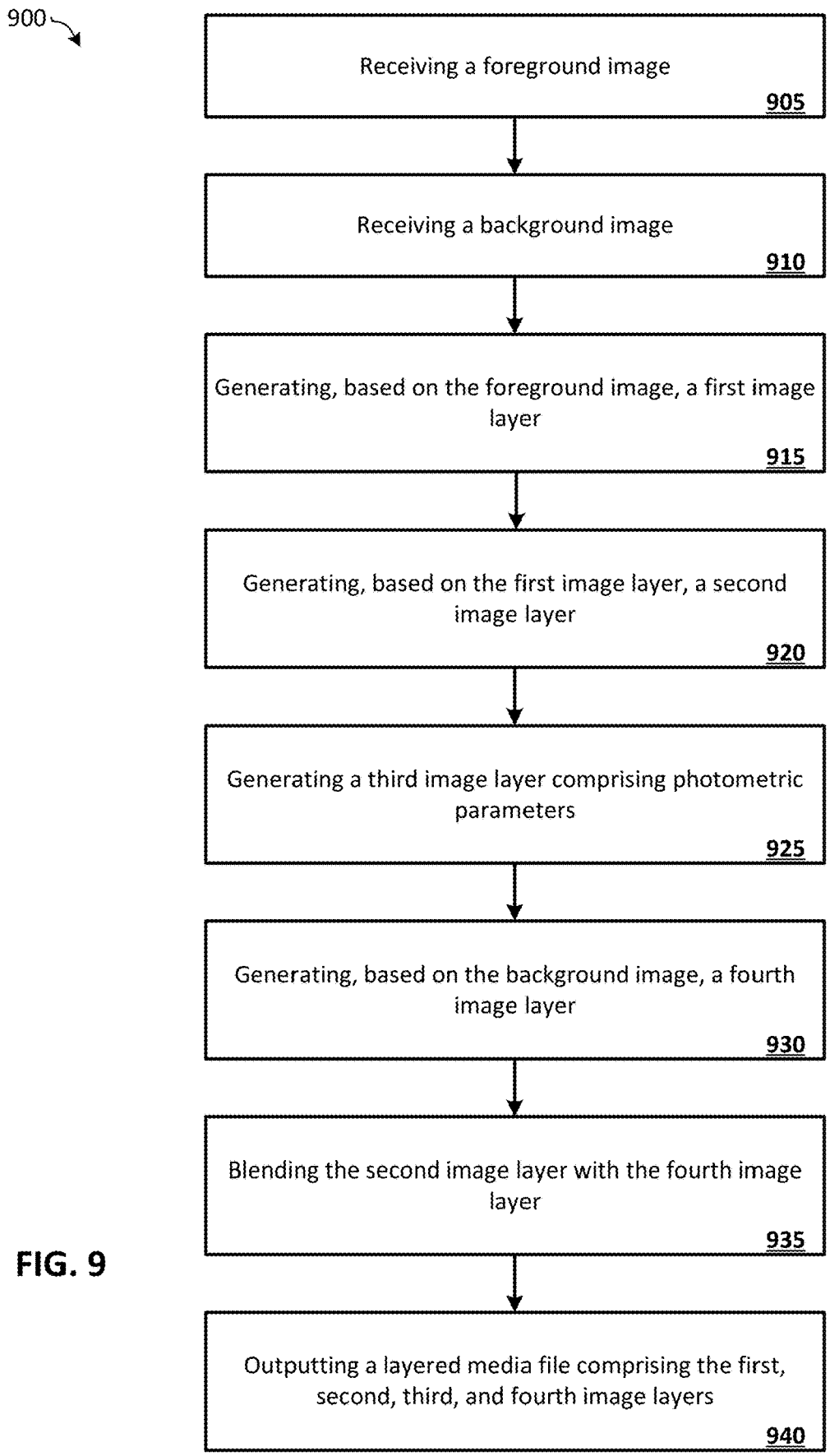
FIG. 9 illustrates an example process in accordance with one or more embodiments.

FIG. 9 illustrates exemplary process 900 for generating a photo creation by blending a background image with a foreground image. Process 900 may be performed by a blending engine of an image editing system. At 905, the blending engine receives a foreground image. The foreground image may be selected by various means. In one embodiment, the foreground image may be received as a result of one or more parts of the image editing system performing one or more processes associated with process 300. In one embodiment, the foreground image may comprise a human face. At 910, the blending engine receives a background image. The background image may be selected by various means. In one embodiment, the background image may be received as a result of the one or more parts of the image editing system performing one or more processes associated with process 700. In one embodiment, the background image may comprise an image that does not contain a human face. In one embodiment, both the foreground image and the background image may be resized to be of a similar size. For example, both the foreground and the background image may be resized to be 8 inches by 8 inches.

At 915, the blending engine generates, based on the foreground image, a first image layer. The first image layer may comprise of an unedited or unaltered version of the foreground image. In an embodiment, the unedited or unaltered version of the foreground image may be a resized foreground image.

At 920, the blending engine generates, based on the first image layer, a second image layer. The second image layer may comprise a subject within the foreground image on a white or opaque background. In one embodiment, object detection techniques (e.g., a machine learning model) may be utilized to determine a subject within the foreground image. The subject may be a human face within the foreground image. Once the subject within the foreground image is selected, a selection mask may be generated and combined with the subject to generate an image that comprises the identified subject with a blank, white, opaque, light blue, or the like background. By creating a selection mask, the pixels associated with the subject, within the second image layer, may comprise transparent pixels. The transparent pixels may allow for the background image to be visible at the same time the subject is visible.

At 925, the blending engine generates a third layer comprising photometric parameters. Photometric parameters may include a brightness value associated with one or more pixels within the subject of the foreground image, a luminance value associated with one or more pixels within the subject of the foreground image, a saturation value associated with one or more pixels within the subject of the foreground image, and the like. The third image layer may be utilized to control photometric parameters of the second image layer and/or photometric parameters of a photo creation.

At 930, the blending engine generates, based on the background image, a fourth image layer. The fourth image layer may comprise a region of interest of the background image. The region of interest may be identified by a deep reinforcement learning model or another means. The region of interest may be a particular portion of the background image that contains high quality imagery. For example, the region of interest may be the brightest portion of a background image or a portion with the highest image aesthetic score.

At 935, the blending engine blends the second image layer with the fourth image layer. The blending engine may blend the second image layer and the fourth image layer together by various techniques. For example, one blending technique may be implemented by the formula: $f(x,y)=1-(1-x)(1-y)$, where x is a pixel in the second image layer and y is a corresponding pixel in the fourth image layer. This blending technique takes the values of pixels in the second image layer and fourth image layer and inverts them, then multiplies them, and then inverts them again. This particular blending technique may result in a brighter picture than other blending techniques. In addition, this particular blending technique may result in a double exposure image effect between the second image layer and the fourth image layer such that the fourth image layer is visible only within the subject of the second image layer. In one embodiment, another blending technique may be simply multiplying pixel values together, for which a formula may be $f(x,y)=x*y$. This second blending technique may blend together the second image layer and fourth image layer and create a darker picture. The second blending technique may also result in a double exposure image effect between the second image layer and the fourth image layer such that the fourth image layer is visible only within the subject of the second image layer.

At 940, the blending engine outputs a layered media file comprising the first, second, third, and fourth image layers. The layered media file may comprise a photo creation. The photo creation may be a blended image comprising a plurality of image layers. For example, the photo creation may be an image created from blending the second, third, and fourth image layers. As a result, the layered media file contains not only the photo creation, but the image layers that are utilized to generate the photo creation. In one embodiment, the image layers within the layered media file are separately engageable and editable. In one embodiment, the layered media file may be a photoshop file format (psd).

In one embodiment, all process associated with processes 300, 700, and 900 are performed automatically by the image editing system without additional input from a user. As such, a user may select a "generate photo creation" option within a graphical user interface, and subsequently the image editing system may perform processes associated with processes 300, 700, and/or 900 to create a photo creation based on one or more images associated with the user.

Figure 10:
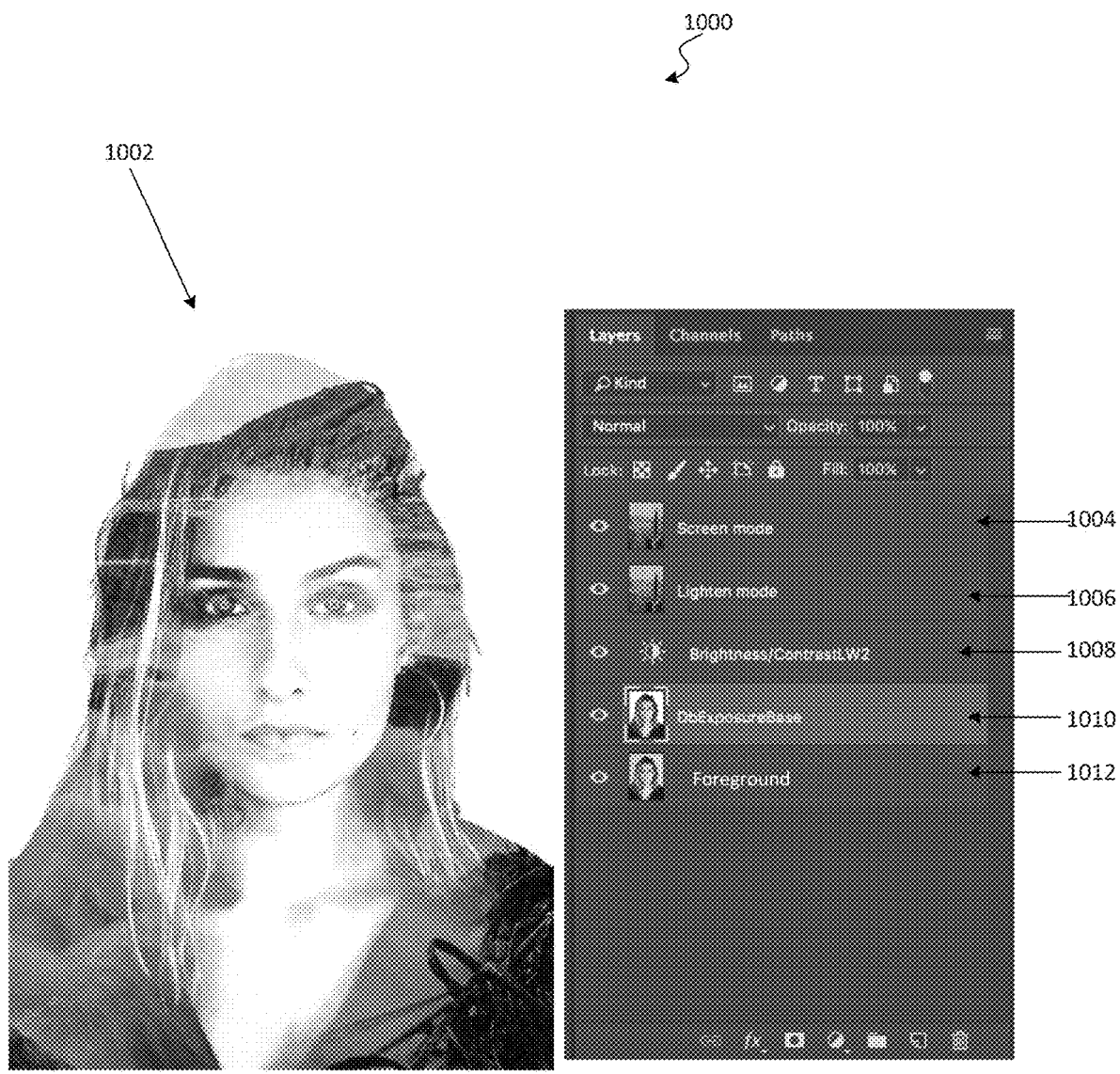
FIG. 10 illustrates an example output with a blended image in accordance with one or more embodiments.

FIG. 10 depicts an exemplary output 1000 that may be generated based one or more embodiments. Output 1000 may be generated by an image editing system. Output 1000 may be a layered media file. Output 1000 may comprise photo creation 1002, and plurality of layers 1004-1012. Photo creation 1002 may be an image created based on blending two or more images. In the depicted embodiment, photo creation 1002 is an image with a double exposure effect. Photo creation 1002 includes a subject (i.e., a woman's face) that is blended with an image of a coast (i.e. background image).

Layers 1004-1012 may comprise one or more layers that make up photo creation 1002. Each of the layers 1004-1012 may be engageable and editable, such that each of the layers 1004-1012 may be individually modified. Layer 1004 and layer 1006 may contain background images. In one embodiment, only one of layer 1004 and layer 1006 may be utilized to create photo creation 1002. For example, layer 1004 may be a layer comprising a first background image and layer 1006 may be a layer comprising an alternate background image. In such an example, photo creation 1002 may be created using layer 1004, but not layer 1006. However, layer 1006 may be selected to replace layer 1004, thus altering photo creation 1002. In one embodiment, layer 1004 and/or layer 1006 may be analogous to the fourth image layer as detailed in relation to process 900 as depicted in FIG. 9.

Layer 1008 may be an adjustment layer that controls the brightness and/or contrast properties of photo creation 1002. In one embodiment, layer 1008 may be analogous to the third image layer as detailed in relation to process 900. Layer 1010 may be a base layer for photo creation 1002. In one embodiment, layer 1010 may be analogous to the second image layer as detailed in relation to process 900. Layer 1012 may be a layer comprising a foreground image. In one embodiment, layer 1012 may be analogous to the first image layer as detailed in relation to process 900.

Any one of layers 1004-1012 may be modified. For example, layer 1008 may be modified to alter the contrast and brightness of photo creation 1002. In another example, layer 1012 may be modified by importing another foreground image into layer 1012 in order to change the subject within photo creation 1002. In one embodiment, whenever a layer is edited, a new photo creation may be created. As a result of output 1000 comprising not only photo creation 1002, but the layers that make up photo creation 1002, an automatically generated photo creation that may be edited after it is generated.

Figure 11:
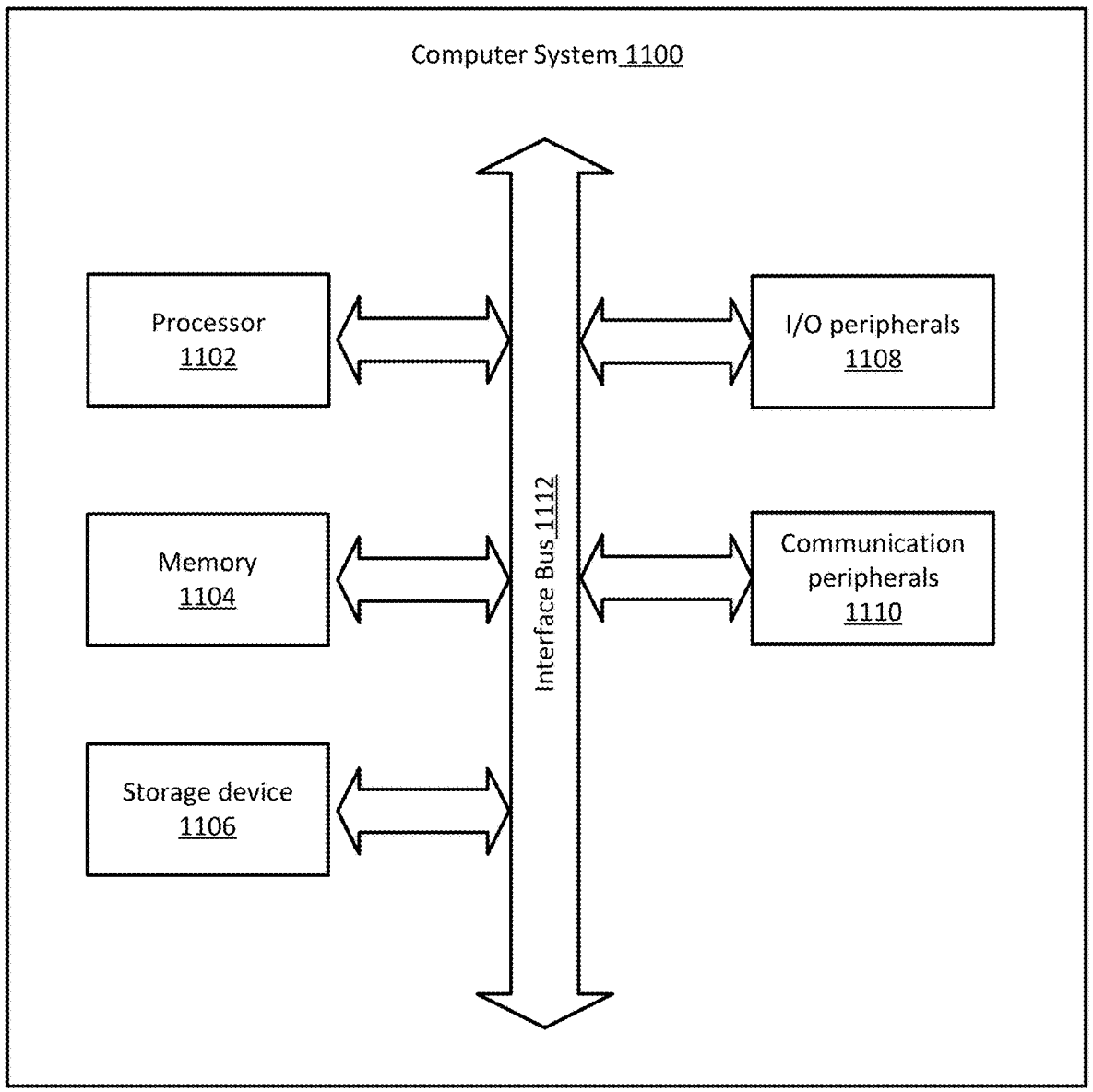
FIG. 11 depicts a simplified computer system for performing one or more processes in accordance with one or more embodiments.

Any suitable computer system or group of computer systems can be used for performing the operations and processes described herein. For example, FIG. 11 depicts an example of the computer system 1100. The implementation of computer system 1100 could be used to perform one or more parts of processes disclosed herein.

The depicted example of a computer system 1100 includes a processor 1102 communicatively coupled to one or more memory devices 1104. The processor 1102 executes computer-executable program code stored in a memory device 1104, accesses information stored in the memory device 1104, or both. Examples of the processor 1102 include a microprocessor, an application-specific integrated circuit ("ASIC"), a field-programmable gate array ("FPGA"), or any other suitable processing device. The processor 1102 can include any number of processing devices, including a single processing device.

A memory device 1104 includes any suitable non-transitory computer-readable medium for storing program code or program data. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

A storage device 1106 includes additional storage for computer system 1100. In one embodiment, storage device 1106 may be implemented by a hard drive disk and/or a steady state drive. In one embodiment, storage device 1106 may store one or more sets of operations mapping and machine learning models.

The computer system 1100 may also include a number of external or internal devices, such as a monitor, keyboard, mouse, or other input or output devices. For example, computer system 900 is shown with one or more input/output ("I/O") peripheral 1108. An I/O peripheral 1108 can receive input from input devices or provide output to output devices. One or more buses 1112 are also included in the computer system 1100. Bus 1112 communicatively couples one or more components of a respective one of the computer system 1100.

In some embodiments, the computer system 1100 also includes network communications peripherals 1110. The network communications peripherals 1110 include any device or group of devices suitable for establishing a wired or wireless data connection to one or more data networks. Non-limiting examples of the network communications peripherals 1110 include an Ethernet network adapter, a modem, and/or the like. The computer system 1100 is able to communicate with one or more other computer devices via a data network using network communications peripherals 1110. For example, computer system 1100 may receive one or more images via network communications peripherals 1110.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computer," "calculating," "determining," and "identifying" or the like refer to actions or processes of a computer device, such as one or more computers or a similar electronic computer device or devices, that manipulate or transform data represented as physical electronic or magnetic quantities within memories, registers, or other information storage devices, transmission devices, or display devices of the computer platform.

The system or systems discussed herein are not limited to any particular hardware architecture or configuration. A computer device can include any suitable arrangement of components that provide a result conditioned on one or more inputs. Suitable computer devices include multi-purpose microprocessor-based computer systems accessing stored software that programs or configures the computer system from a general-purpose computer apparatus to a specialized computer apparatus implementing one or more embodiments of the present subject matter. Any suitable programming, scripting, or other type of language or combinations of languages may be used to implement the teachings contained herein in software to be used in programming or configuring a computer device.

Embodiments of the methods disclosed herein may be performed in the operation of such computer devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method that includes one or more processors performing operations comprising:
receiving a first plurality of images associated with a user;
generating, for a first image from the first plurality of images, a face quality score based on a number of faces in the first image and a face prominence ratio determined from a diameter of a face in the first image;
selecting, based on the face quality score, the first image;
identifying, from a second plurality of images associated with the user, a second image, wherein the second image depicts zero human faces; and
blending the first image with the second image to produce a photo creation.

2. The computer-implemented method of claim 1, the operations further comprising:
identifying, based on an image aesthetic score of each image within the second plurality of images, the second image.

3. The computer-implemented method of claim 1, wherein the second image is associated with an image tag that indicates contents within an image.

4. The computer-implemented method of claim 1, wherein the blending of the first image and the second image comprises:
inverting one or more pixels of the first image to generate a first set of inverted pixels;
inverting one or more pixels of the second image to generate a second set of inverted pixels; and
multiplying the first set of inverted pixels with the second set of inverted pixels.

5. The computer-implemented method of claim 4, the operations further comprising inverting a product of the first set of inverted pixels and the second set of inverted pixels.

6. The computer-implemented method of claim 1, the operations further comprising:
generating a first image layer based on the first image;
generating a second image layer comprising a masked version of the first image;
generating, based on the second image layer, a third image layer comprising photometric parameters associated with the second image layer;
generating a fourth image layer based on the second image;
creating the photo creation with a double exposure effect by at least blending pixels of the second image layer and the fourth image layer; and
outputting the photo creation with the double exposure effect with modifiable layers as an output file.

7. The computer-implemented method of claim 6, the operations further comprising:
subsequent to the photo creation being created, modifying the first image layer, the second image layer, the third image layer, or the fourth image layer.

8. A non-transitory computer-readable storage medium having stored thereon instructions that are executable by one or more processing devices to perform operations comprising:
receiving a first plurality of images associated with a user;
generating, for a first image from the first plurality of images, a face quality score based on a number of faces in the first image and a face prominence ratio determined from a diameter of a face in the first image;
selecting, based on the face quality score, the first image;
identifying, from a second plurality of images associated with the user a second image, wherein the second image depicts zero human faces; and
blending the first image with the second image to produce a photo creation.

9. The non-transitory computer-readable storage medium of claim 8, the operations further comprising:
identifying, based on an image aesthetic score of each image within the second plurality of images, the second image.

10. The non-transitory computer-readable storage medium of claim 8, wherein the second image is associated with an image tag that indicates contents within an image.

11. The non-transitory computer-readable storage medium of claim 8, wherein blending of the first image and the second image comprises:
inverting one or more pixels of the first image to generate a first set of inverted pixels;
inverting one or more pixels of the second image to generate a second set of inverted pixels; and
multiplying the first set of inverted pixels with the second set of inverted pixels.

12. The non-transitory computer-readable storage medium of claim 11, the operations further comprising inverting a product of the first set of inverted pixels and the second set of inverted pixels.

13. The non-transitory computer-readable storage medium of claim 12, the operations further comprising:
generating a first image layer based on the first image;
generating a second image layer comprising a masked version of the first image;
generating, based on the second image layer, a third image layer comprising photometric parameters associated with the second image layer;
generating a fourth image layer based on the second image;
creating the photo creation with a double exposure effect by at least blending pixels of the second image layer and the fourth image layer; and
outputting the photo creation with the double exposure effect with modifiable layers as an output file.

14. The non-transitory computer-readable storage medium of claim 13, the operations further comprising:
subsequent to the photo creation being created, modifying the first image layer, the second image layer, the third image layer, or the fourth image layer.

15. A system comprising:
one or more processors; and
a memory coupled with the one or more processors, the memory configured to store instructions that when executed by the one or more processors cause the one or more processors to:
receive a first plurality of images associated with a user;
generate, for a first image from the first plurality of images, a face quality score based on a number of faces in the first image and a face prominence ratio determined from a diameter of a face in the first image;

select, based on the face quality score, the first image;

identify, from a second plurality of images associated with the user, a second image, wherein the second image depicts zero human faces; and blend the first image with the second image to produce a photo creation.

16. The system of claim 15, wherein the instructions when executed by the one or more processors, further cause the one or more processors to identify, based on an image aesthetic score of each image within the second plurality of images, the second image.

17. The system of claim 15, wherein the second image is associated with an image tag that indicates contents within an image.

18. The system of claim 15, wherein the instructions when executed by the one or more processors, further cause the one or more processors to:

invert one or more pixels of the first image to generate a first set of inverted pixels;

invert one or more pixels of the second image to generate a second set of inverted pixels; and multiply the first set of inverted pixels with the second set of inverted pixels.

19. The system of claim 18, wherein the instructions, when executed by the one or more processors, further cause the one or more processors to invert a product of the first set of inverted pixels and the second set of inverted pixels.

20. The system of claim 15, wherein the instructions that when executed by the one or more processors further cause the one or more processors to:

generate a first image layer based on the first image;

generate a second image layer comprising a masked version of the first image;

generate, based on the second image layer, a third image layer comprising photometric parameters associated with the second image layer;

generate a fourth image layer based on the second image;

create the photo creation with a double exposure effect by at least blending pixels of the second image layer and the fourth image layer; and output the photo creation with the double exposure effect with modifiable layers as an output file.

* * * * *